(12) United States Patent
Stroeks et al.

(10) Patent No.: US 9,068,042 B2
(45) Date of Patent: Jun. 30, 2015

(54) TRANSPARENT FILMS

(71) Applicant: DSM IP ASSETS B.V., Heerlen (NL)

(72) Inventors: Alexander Antonius Maria Stroeks, Valkenburg Aan de Geul (NL); Rudy Rulkens, Margraten (NL); Lee Sanghoon, Shanghai (CN); Sidiki Tamim Peter, Heinsberg (DE)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/160,172

(22) Filed: Jan. 21, 2014

(65) Prior Publication Data

US 2014/0135444 A1 May 15, 2014

Related U.S. Application Data

(62) Division of application No. 13/144,542, filed as application No. PCT/EP2010/050448 on Jan. 15, 2010, now abandoned.

(30) Foreign Application Priority Data

Jan. 16, 2009 (EP) ..................................... 09150776

(51) Int. Cl.
| | |
|---|---|
| *C08L 77/00* | (2006.01) |
| *C08G 69/02* | (2006.01) |
| *B65D 65/02* | (2006.01) |
| *C08G 69/26* | (2006.01) |
| *C08J 5/18* | (2006.01) |
| *B29C 47/00* | (2006.01) |
| *B29C 47/88* | (2006.01) |
| *C08L 77/06* | (2006.01) |

(52) U.S. Cl.
CPC . *C08G 69/26* (2013.01); *C08J 5/18* (2013.01); *C08J 2377/00* (2013.01); *B29C 47/0057* (2013.01); *B29C 47/8845* (2013.01); *B29C 47/8895* (2013.01); *C08L 77/06* (2013.01)

(58) Field of Classification Search
CPC ........ C08G 69/02; C08G 69/04; C08G 69/08; C08G 69/26; C08G 69/36
See application file for complete search history.

(56) References Cited

U.S. PATENT DOCUMENTS

| | | | |
|---|---|---|---|
| 4,404,317 A | 9/1983 | Epstein et al. | |
| 4,699,973 A | 10/1987 | Ito et al. | |
| 6,410,156 B1 | 6/2002 | Akkapeddi et al. | |
| 2002/0173596 A1 | 11/2002 | Montanari et al. | |
| 2004/0158028 A1* | 8/2004 | Buhler | 528/331 |
| 2006/0036044 A1 | 2/2006 | Cheng | |
| 2007/0128442 A1 | 6/2007 | Buehler | |
| 2009/0318630 A1 | 12/2009 | Montanari et al. | |

OTHER PUBLICATIONS

Polyamid Handbuch, Becker et al, Kunststoff Handbuch 3/4 Polyamide, Hanser Verlag: München/Wien, chapter 6.2.3.4, p. 815 (1988).

* cited by examiner

*Primary Examiner* — Ana Woodward
(74) *Attorney, Agent, or Firm* — Nixon & Vanderhye P.C.

(57) ABSTRACT

The invention relates to an optically transparent polymer film or extrudate product made of a polymer composition comprising a semi-crystalline polyamide having a melting temperature of at least 270° C. or a blend of the semi-crystalline polyamide (A) and a second polymer (B), and optionally at least one additive, wherein the semi-crystalline polyamide (A) is present in an amount of more than 50 wt. %, relative to the total weight of the polymer composition, the polymer composition in the optically transparent polymer film or extrudate product has a melting temperature (Tm-C) in the range of 270-340° C., and wherein the film or a part of the extrudate product has a haze of less than 12% and a light transmittance, of at least 88% measured with the method according to ASTM D1003A.

9 Claims, No Drawings

TRANSPARENT FILMS

This application is a divisional of commonly owned U.S. application Ser. No. 13/144,542, filed Dec. 31, 2011 (now abandoned) which is the national phase application under 35 USC §371 of PCT/EP2010/050448, filed Jan. 15, 2010 which designated the U.S. and claims priority to EP Patent Application No. 09150776.4 filed Jan. 16, 2009, the entire contents of each of which are hereby incorporated by reference.

The present invention relates to optically transparent polymer films and other optically transparent extruded products. More particular, the present invention relates to such products made of a polyamide composition that are both transparent and have good mechanical and thermal properties, more particular high heat resistance. The invention also relates to high temperature resistant polymer film materials that are used as substrate material for inorganic deposition with the aim of achieving ultra-high barrier flexible film materials.

Heat resistant transparent sheets and films are being explored for possible use in electronic devices, such as displays, as a replacement for conventional glass substrates, in order to improve flexibility and produce thinner, more lightweight products. These films must have high thermal deformation temperatures of more than 250° C.: i.e. higher than for conventional acrylic or polycarbonate sheets. Currently used materials for high temperature film applications include polyethylene naphthalate (PEN), polyarylate (PAR), polyethersulfon (PES), polyamideimide (PAI), polyimide (PI), polyetherimide (PEI) and polynorbornene (PNB). Due to their high melting temperature or glass transition temperature films made of these materials keep their shape and mechanical properties up to relatively high temperatures and do not melt or degrade unless heated to very high temperature. Recently, high heat durable transparent polyimide films, with a thickness of up to 0.25 mm, a light transmittance of 90% and capable of enduring temperatures of up to 280° C., were developed by Mitsubishi. However, most of these materials are expensive and difficult to process.

Polyamide resins have excellent toughness, strength, and chemical resistance, which make them useful as engineering resins for a wide variety of applications. For many applications it would be desirable to use a transparent polyamide, but many polyamides are semi-crystalline materials, and, as such, are often opaque as incident light is scattered by the crystalline domains present in the polymers. Transparent polyamides are known, but are typically amorphous, or blends of amorphous thermoplastic aliphatic copolyamides with limited amounts of semicrystalline thermoplastic polyamides, or semicrystalline thermoplastic polyamides with low melting point and relative low crystallization speed, and as a result, have reduced heat resistance and articles formed from these materials tend to suffer from creeping or deformation over time.

US patent application US2006/0030692A1 describes products with a transparency of at least 80%. In one example 88% transparency is mentioned. These products are based on microcrystalline copolyamides with a crystallinity of 10-30% comprising at least 50 wt. % of monomers with at least 9 C atoms. The products have a glass transition temperature of 40-90° C. and melting temperature of 150-200° C.

U.S. Pat. No. 4,404,317 discloses blends of amorphous thermoplastic aliphatic polyamides copolymers with semicrystalline thermoplastic polyamides. The resulting blends could be made transparent and are disclosed to have good solvent resistance, dimensional stability, and retention of physical properties under moist or wet conditions. Japanese patent application publication 03-033157 discloses a polyamide resin composition with improved alcohol resistance prepared by compounding a copolyamide obtained from isophthalic acid, terephthalic acid, hexamethylenediamine and an alicyclic diamine, with a semiaromatic polyamide obtained from an aromatic diamine and a dicarboxylic acid.

US patent application US2006/036044-A1 discloses a blend of 50-95 wt. % of an amorphous semi-aromatic polyamide and 5-50 wt. % of a semi-crystalline semi-aromatic polyamide having a melting temperature at least 280° C. These compositions have a light transmittance of as low as 65% or more. In one example, for which a light transmittance of 89% was reported, the composition comprised 18 wt. % of the semi-crystalline semi-aromatic polyamide and 82 wt. % of an amorphous semi-aromatic polyamide.

Thus there is a need for high temperature resistant polymer film materials, in particular for better performing materials compared to the amorphous polyamides and/or cheaper materials like the polyimides.

It is an object of the present invention to provide a polyamide polymer film that is both transparent and has good mechanical properties and retention thereof at elevated temperature as well as a high heat resistance, exhibited by dimensional stability with limited thermal expansion and/or high deformation temperatures. Another object of the present invention is to provide polyamide polymer films that have both transparency and improved barrier properties.

The invention disclosed and claimed herein concerns a transparent polymer film or an extrudate product made of a polymer composition comprising a semi-crystalline polyamide (A) wherein the semi-crystalline polyamide (A) has a melting temperature (Tm-A) of at least 270° C. and is present in an amount of respectively at least 60 wt. % in case the semi-crystalline polyamide (A) consists of a semi-aromatic semi-crystalline polyamide or of a blend of a semi-aromatic semi-crystalline polyamide and an aliphatic semi-crystalline polyamide, or at least 75 wt. % in case the semi-crystalline polyamide (A) consists of an aliphatic semi-crystalline polyamide, wherein the wt. % is relative to the total weight of the polymer composition, the polymer composition has a melting temperature (Tm-C) of at least 270° C., and the film or a part of the extrudate product has a haze of less than 12% and a light transmittance of at least 88%, measured with the method according to ASTM D1003A.

The term semi-crystalline polyamide used further herein will be meant to include both semi-aromatic semi-crystalline polyamide and aliphatic semi-crystalline polyamide, unless specifically expressed otherwise.

With an optically transparent product is further herein understood, if not specified otherwise, a product comprising an integral part having a light transmittance of at least 88%, measured according to ASTM D1003A. With the light transmittance is understood the percentage of the luminous flux transmitted through a specimen compared to the luminous flux incident upon it. The haze is the percentage of transmitted light passing through a specimen by forward scattering, which deviates from the incident light by no more than 2.5°. The optical properties are measured on the film as such, or on the thin part in the extrudate product, without correction for the thicknesses.

Further herein the term optically transparent and transparent may be used next to each other but will have the same meaning, i.e. optically transparent, unless clearly stated otherwise.

A film is herein understood to have the regular meaning of a product with a flat shape that is generally indicated with the word film or sheet. Whereas the word films and sheets might be used elsewhere to discriminate for example between thinner and thicker products, or between semi-endless products and products with limited length, respectively, the word film is herein understood to cover all of these. Semi-endless thin films may easily take the form of a long roll film, while sheets with limited length may be stacked into piles.

With the term extrudate product is herein understood a product obtained by an extrusion process, but that is not a film or a sheet. Whereas a film or sheet will typically extend in two dimensions, apart form its thickness, the extrudate product is herein understood to differ from a film or sheet in that it extends in three dimensions. For example, the extrudate product may be a tube or a profile.

The part of the extrudate product having a haze of less than 12% and a light transmittance of at least 88% will herein also be denoted as transparent part.

With the term melting temperature is herein understood the melting temperature, measured with the method according to ASTM D3418-03 by DSC in the second heating run with a heating rate of 10° C./min. Herein the maximum peak of the melting endotherm is taken as the melting temperature.

The melting temperature Tm-A of the semi-crystalline polyamide (A) mentioned herein is determined on the polymer, whereas the melting temperature Tm-C of the composition is measured on the composition in the film or extrudate product.

With a semi-crystalline polymer is herein understood a polymer having a melting enthalpy of at least 5 J/g. In line with that an amorphous polymer is herein understood to be a polymer having a melting enthalpy of less than 5 J/g.

With the term melting enthalpy is herein understood the exothermic energy, measured with the method according to ASTM D3418-03 by DSC in the second heating run with a heating rate of 10° C./min.

With the term glass transition temperature (Tg) used herein is understood the temperature, measured with the method according to ASTM E 1356-91 by DSC in the second heating run with a heating rate of 10° C./min, falling in the glass transition range and showing the highest glass transition rate. The temperature showing the highest glass transition rate is determined as the temperature at the peak of the first derivative (with respect of time) of the parent thermal curve corresponding with the inflection point of the parent thermal curve.

The polymer composition in the transparent polymer film and extrudate product according to the invention may comprise next to the semi-crystalline polyamide with the said high melting point one or more other polymers and/or one or more additives. A requirement is however that the resulting polymer composition has a melting temperature (Tm-C) of at least 270° C. Preferably Tm-C is in the range of 270-340° C., more preferably in the range of 280-330° C., or even better 290-320° C. The higher the melting temperature, the better the high heat resistance is. On the other hand, in general the lower the melting temperature, the easier the processing is.

The melting temperature Tm-A of the semi-crystalline polyamide (A), being at least 270° C., may vary over a wide range and may be as high as or even higher than 340° C. This latter will depend on the thermal stability of the semi-crystalline polyamide (A) and the compounding possibilities thereof. The processing will be improved when such a high melting polymeide is blended with another lower melting semi-crystalline or amorphous polyamide. Preferably, the semi-crystalline polyamide has a Tm-A in the range of 270-340° C.

The polymer composition, or the semi-crystalline polyamide (A) therein, has a melting enthalpy, which may vary over a large range.

In a preferred embodiment of the invention, the polymer composition, or the semi-crystalline polyamide (A) therein, has a melting enthalpy, of at least 25 J/g, more preferably at least 40 J/g, and still more preferably at least 50 J/g. In line with the present invention the melting enthalpy shall be primarily related to the melting point of the semi-crystalline polyamide (A), and consequently shall be within, or close to the temperature range of 270-340° C. Preferably, at least 50%, more preferably at least 75% of the measured melting enthalpy shall be within the temperature range of 270-340° C.

The higher the crystallinity of the transparent product, the better the heat resistance and dimensional stability at elevated temperatures, better mechanical properties, and lower thermal expansion. Especially after stretching and/or heat setting of the film or annealing of the extrudate product the melt enthalpy may increase and may attain values well above 70 J/g, and even as high as 90 J/g and higher, possibly attain values >90 J/g, while still having a transparent polyamide. Though the films may have a melt enthalpy as high as 120 J/g or higher, very good properties are already obtained when the melting enthalpy is in the range of 25-100 J/g.

The semi-crystalline polyamide (A) may be any semi-crystalline polyamide having a melting temperature of at least 270° C. and preferably is in the range of 270-340° C. Suitably said semi-crystalline polyamide is a semi-crystalline semi-aromatic polyamide, or a semi-crystalline aliphatic polyamide or a combination, or any blend thereof. In case the semi-crystalline polyamide (A) consists of a blend of different semi-crystalline polyamides, the melting temperature of the blend shall still be at least 270° C., and preferably be in the range of 270-340° C.

The semi-crystalline aliphatic polyamide can be for example polytetramethylene adipamide (PA46), or a copolyamide of PA46, for example a copolyamide of PA46 and PA6 or PA66, or a copolyamide of PA66 and PA6CHDA, wherein CHDA represents units derived from 1,4-cyclohexanedicarboxylic acid.

The semi-crystalline semi-aromatic polyamide can be a polyamide with repeat units derived from dicarboxylic acids and diamines wherein either the dicarboxylic acids, or the diamines, or both, comprises aromatic components while the remainder comprises aliphatic dicarboxylic acids and/or diamines, which can be linear, branched, or cyclic, and/or arylaliphatic dicarboxylic acids and diamines.

Examples of suitable aromatic dicarboxylic acids are terephthalic acid and isophthalic acid.

Preferably, the semi-crystalline semi-aromatic polyamide comprises repeat units derived from terephthalic acid as the dicarboxylic acids. Examples of suitable aromatic diamines are meta-xylylene diamine and para-xylylene diamine.

Examples of suitable semi-crystalline semi-aromatic polyamides include homopolyamides like PA7T, PA9T, PA10T and PA12T having a melting temperature in the range of 270-350° C., and copolyamides of PA4T, PA5T, PA6T and/or PA8T, with for example PA7T, PA9T, PA10T, PA 11T PA12T, PA6, PA66, and/or PMXD6. The homopolymers of PA4T, PA5T, PA6T and PA8T have a melting temperature above 340° C., but the copolymers can be formulated such as to have a melting temperature below 340° C. Suitable copolyamides include PA10T/6T, PA9T/M8T (wherein M8=2-Methyl octamethylene diamine), PA6T/5T, PA6T/M5T (wherein M5=2-Methyl pentamethylene diamine), and PA6T/10T. The polyamides may comprise other repeat units of other diamines and diacids, next to those mentioned in the copolyamides hereabove, thus forming more complex copolyamides. For further examples of suitable semi-crystalline semi-aromatic copolyamides see Kunststoff Handbuch, (Carl Hanser Verlag 1998) Band 3/4 Polyamide chapter 6.

Preferably, the semi-crystalline semi-aromatic polyamide has a melting temperature in the range of 290-335° C., more preferably in the range of 310-330° C. With a higher minimum melting temperature the film has better thermal and dimensional properties. With a lower maximum melting temperature the polymer composition can be more easily processed into the transparent film or the extrudate product. A higher melting temperature can be accomplished e.g. by using a higher amount of terephthalic acid and/or alicyclic or aromatic diamines, or short chain linear aliphatic diamines. The person skilled in the art can adapt the melting point using common general knowledge and routine experiments.

In one embodiment of the transparent film, respectively the extrudate product according to the invention, the semi-crystalline polyamide (A) is a semi-crystalline semi-aromatic copolyamide (A-X) consisting of repeat units derived from:
(a) 25-45 mole % terephthalic acid,
(b) 5-25 mole % of an aromatic dicarboxylic acid different from terephthalic acid, and/or an aliphatic dicarboxylic acid
(c) 5-30 mole % of an diamine chosen from the group consisting of ethylene diamine, trimethylene diamine, tetramethylene diamine and pentamethylene diamine
(d) 20-45% of a diamine comprising at least 6 C-atoms, and optionally
(e) 0-10 mole % of one or more aminocarboxylic acids and or lactams, and
(f) 0-3 mole % of compounds being mono-functional or tri-functional in amino and/or carboxylic acid groups;
wherein the mole % of each of a-f is relative to the total of a-f.

The components a-f are preferably present, either individually, or in combination with each other, in the following amounts: (a) 35-45 mole %; (b) 5-15 mole %; (c) 10-25 mole %; (d) 15-25 mole %; (e) 0-5 mole %; and (f) 0-1 mole %, wherein the mole % of each of a-f is relative to the total of a-f.

It has been found that a transparent film or extrudate product according to this embodiment can be easily produced, using film take-up conditions that are typically applied for preparing transparent PA6 films. Of course the temperature of the melt in the extruder has to be adopted because of the higher melting point of the semi-crystalline polyamide A-X. Even when the said semi-crystalline polyamide had a melting temperature as high as 325° C., and was used without a second polymer, a transparent film was obtained. The transparency was also retained after heating of the film despite crystallization induced by and occurring upon said heating.

In this respect it is noted that applying the same conditions for the preparation of films from PA6T/66 polyamide with a melting temperature of about 320° C. did not result in a transparent film but resulted in quite hazy films instead.

Preferably, in the said embodiment the semi-crystalline polyamide (A) has a melting temperature (Tm-A) in the range of 290-335° C., more preferably in the range of 310-330° C. A higher melting temperature can be accomplished e.g. by using a higher amount of component (a) and or component (c) in the semi-crystalline semi-aromatic copolyamide in the above embodiment.

In another embodiment of the transparent film or extrudate product according to the invention, the semi-crystalline polyamide (A) comprises polytetramethylene adipamide (PA46) or a copolyamide of PA46, PA46 consists of repeat units derived form tetramethylene diamine and adipic acid. Copolyamides of PA46 comprise (i) repeat units derived form tetramethylene diamine and adipic acid and (ii) repeat units derived from other diacids, diamines and/or amino carboxylic acids and/or lactams. In line with the present invention the copolyamide must have a melting temperature of at least 270° C., and better in the range 270-340° C. Preferably, the repeat units (i) derived from tetramethylene adipamide are present in an amount of at least 75 wt. %, preferably at least 90 wt. %, relative to the total weight of the copolyamide. The higher the content of the repeat units (i) the better the thermal properties and dimensional stability of the transparent film, respectively the extrudate product.

Polyamide films of PA46 copolyamides are known. However, these are all hazy translucent films. This is generally believed to be due to the fast crystallization speed of PA46, which has been considered to be inhibitive for making transparent films of PA46 at all. The inventors have confirmed that with standard film preparation processes as well as with a film preparation process wherein the extruded film was immediately quenched in a cold quenching liquid, shortly after being taken up by a pick-up roll. Films thus obtained were hazy and showed several irregularities and white spots. The inventors have succeeded in preparing transparent PA46 films by applying a film extrusion process wherein a chilling role was positioned very close to the slit die of the extrusion equipment and cooled with ice water.

The transparent PA46 films thus obtained remained transparent upon longer annealing of the film at elevated temperature. The films showed a high level of crystallinity as exhibited by a high melting enthalpy in DSC measurements. In contrast to the films made of semi-aromatic semi-crystalline polyamides, the PA46 films did not show any sign of post crystallization in said DSC measurements. This might be interpreted in that the transparent PA46 films were already crystallized. Despite that the films were highly transparent.

The transparent PA46 films obtained from the above extrusion process could also be biaxially stretched to high stretching levels without damaging or rupture of the film. This in contrast with the hazy PA46 films described above that were more difficult to draw and showed pin holing and other defects already early in the stretching process.

The optically transparent polymer film, as well as the extrudate product according to the invention, comprising the semi-crystalline polyamide (A) with the high melting point as the major compound, has the advantage of very good thermal stability and dimensional stability. The transparent polymer film also has a low permeability for oxygen ($O_2$) and carbon dioxide ($CO_2$).

The use of a second polymer (B) in the polymer composition in the present invention is in particular advantageous in combination with the higher melting semi-crystalline polyamide, thereby easing the processing of the semi-crystalline polyamide at melt temperatures above the melting temperature for making the transparent film or product according to the invention.

The second polymer (B) may still be present in relatively large amounts to achieve films with improved properties. The amounts of the second polymer that can be used depend on the nature of the semi-crystalline polyamide (A) and the second polymer (B), being either both semi-crystalline or the first one semi-crystalline, and the other amorphous, the melting temperature of the semi-crystalline polymers and the compatibility between the two polymers.

In particular in combination with a higher melting semi-crystalline polyamide, for example with a Tm-A in the range of 300-340° C., the amount of the second polymer (B) may be larger, while still retaining a film or extrudate product with a high heat resistance.

In combination with a somewhat lower melting semi-crystalline polyamide (A), for example with a Tm-A in the range of 280-300° C., the amount that can be used but can still be substantial, meanwhile retaining the melting temperature Tm-C of the polymer composition in the in the range of 270-340° C. With a semi-crystalline polyamide (A) with a Tm-A in the range of 270-280° C., the presence of a second polymer will be critical for the melting temperature Tm-C of the polymer composition, and the amount thereof is preferably very low if not absent at all.

Preferably, the amount of the second polymer is limited thereby obtaining even better mechanical and thermal properties. The better properties can be in better creep resistance, higher mechanical strength, and better dimensional stability at elevated temperature and/or under humid conditions. With a lower amount of the second polymer, the film also shows a lower $O_2$ and/or $CO_2$ permeability.

Suitably, the second polymer is present in an amount of 1-40 wt. % or, more strictly 10-25 wt. %. Preferred amounts for the second polymer, if any, are in the range of 0-25 wt. % and even better 0-10 wt. % Herein the weight percentage, as throughout this specification, are relative to the total weight of the polymer composition, unless expressly noted otherwise.

In case of the presence of an aliphatic semi-crystalline polyamide, the second polymer has to be limited to 25 wt. % anyway.

The second polymer (B) may suitably comprise an amorphous semi-aromatic polyamide and/or a semi-crystalline aliphatic or semi-aromatic polyamide having a melting temperature below 270° C. The second polymer (B) being such an amorphous or low melting semi-crystalline polyamide has the advantage of being well compatible with the semi-crystalline polyamide (A), leading to higher transparency and lower haze values.

Such amorphous or lower melting semi-crystalline polyamides may well have an $O_2$ and/or $CO_2$ permeability that is higher than that of the semi-crystalline polyamide (A). It has been observed that with a content of 25 wt. % or less of the second polymer (B) even when having such a higher $O_2$ and/or $CO_2$ permeability, the low $O_2$ and/or $CO_2$ permeability of the semi-crystalline polyamide (A) in the transparent film is hardly affected.

An example of such a lower melting semi-crystalline polyamide that can suitably be used in the present invention is polyamide-6.

The polymer composition in the film or extrudate product according to the invention optionally comprises, next to the semi-crystalline polyamide (A) or the blend thereof with the second polymer (B), one or more additives. The additive, or additives, can be any auxiliary additive used in transparent films, provided the individual amounts and combinations are chosen such that the transparency is not jeopardized, at least not in significant extent. These additives may be chosen from the group consisting of plasticizers, stabilizers, dyes, optical brighteners, coloring agents, lubricants, nanoscale filler and strengthening materials, and preferably comprises heat stabilizers and/or nanoscale fillers. Types and amounts of additives can be selected by the skilled person by common general knowledge and routine measurement. Suitably, the additive, or additives, are present in an amount in the range of 0.01-20 wt. %, preferably 0.1-10 wt. %, 0.25-5 wt. %. Herein the wt. % are relative to the total weight of the composition.

The polymer composition in the film or extrudate product according to the invention may well consists of:
(A) 60-100 wt. % of the semi-crystalline semi-aromatic polyamide having a Tm-A in the range of 270-340° C.,
(B) 0-40 wt. % of the second polymer, and
(C) 0-10 wt. % of at least one additive,
wherein the wt. % are relative to the total weight of the polymer composition.

It is noted that the amounts of A, B and C can vary within the said ranges, meanwhile they are linked to each other in the sense that the combined amount of A, B, and C is 100%.

Preferably the polymer composition consists of:
(A) 75-99.75 wt. % of the semi-crystalline polyamide having a Tm-A in the range of 270-340° C.,
(B) 0-25 wt. % of the second polymer, and
(C) 0.25-10 wt. % of at least one additive,
wherein the wt. % are relative to the total weight of the polymer composition.

In a particular embodiment the polymer composition consists of
(A) 85-99.5 wt. % of the semi-crystalline polyamide having a Tm-A in the range of 270-340° C.,
(B) 0-14.5 wt. % of a second polymer, and
(C) 0.5-5 wt. % of at least one additive,
wherein the wt. % are relative to the total weight of the polymer composition.

The film or according to the invention, as well as the thin transparent part in the extrudate product according to the invention, may have a thickness varying over a broad range, while still having sufficient transparency. The range will depend on the type of semi-crystalline polyamide as well as on the process conditions applied. With semi-crystalline semi-aromatic copolyamides like the polyamide (A-X) described above the thickness may be as high as 500 µm or even higher, while still having good transparency properties. The thickness may be as low as 1 µm or lower. Preferably the thickness is in the range of 1-200 µm. With polyamide 46 as the main component in the polymer composition, the thickness of the film or of the thin transparent part of the extrudate product will generally be lower, and suitably the thickness is in the preferred range of 1-200 µm.

In general the more preferred thickness is in the range of 5-150 µm, or even 10-100 µm, or still more preferred 20-60 µm.

The film, as well as the thin transparent part in the extrudate product according to the invention also preferably has a haze of less than 5%, more preferably less than 2%, and/or a light transmittance of at least 90%, more preferably more than 92%, when measured according to ASTM D1003A.

The invention also relates to a process for preparing a transparent polymer film as according to the invention. The process according to the invention comprises steps wherein
(1) a polymer composition comprising a semi-crystalline polyamide (A) having a melting temperature (Tm-A) of at least 270° C. as described hereabove is heated and melt extruded through a slit die to form an extruded polymer layer;
(2) the extruded polymer layer is led over a chilling role having a temperature below 40° C., thereby forming a polymer film, and
(3) the polymer film is collected,
wherein the polymer film has a haze of less than 12% and a light transmittance of at least 88% when measured according to ASTM D1003A.

Preferably, the slit die and the chilling role are separated from each other by a distance of at most 2 cm, more preferably 1.5 cm, and the chilling role has a surface temperature of at most 10° C., more preferably at most 8° C. In a preferred embodiment of the process, the distance is at most 1.3 cm and the chilling role has a surface temperature of at most 5° C. More preferably the chilling role has a wet surface and is cooled with ice water. This provides a better contact between the extruded polymer layer and the chill role and an even better cooling of the polymer film. This latter embodiment is advantageously applied for preparing transparent PA46 films with relative large thickness. To achieve an even better contact between the chilling role and the extruded polymer layer, pinning techniques, like electrostatic pinning and air pinning may be applied.

The invention also relates to a process for after-treatment of a polymer film. In said process the transparent polymer film according to the invention or obtained by the process described hereabove, is subjected to a drawing step wherein the film is stretched, or a heat setting or an annealing step, wherein the transparent polymer film, having a glass transition temperature (Tg-C) and a melting temperature (Tm-C), is heated to and/or kept for a certain period, at a temperature between Tg-C and Tm-C.

Since the film obtained by the process may be an amorphous film, which shows an induced crystallization upon heat treatment, and the film only shows a melting temperature after the heat treatment, the melting temperature (Tm-C) referred above relates to the melting temperature measured on the film after the after-treatment. The person skilled in the art will be able to determine the melting temperature by DSC measurements and adjust the temperature applied during the after-treatment process accordingly.

The process for preparing the transparent polymer film and the process for after-treatment of the polymer film may be carried out separately or be combined in one consecutive process. The effects of the drawing step, the heat setting step and the annealing step are increased mechanical properties and reduced water uptake.

The invention also relates to a stretched transparent film, obtainable with the said process.

The invention also relates to a process for preparing an extrudate product comprising a transparent part. The process comprises steps wherein
i. a polymer composition of as described above is heated and melt extruded through a die;
ii. the extruded polymer composition is led through a quenching liquid having a temperature below 40° C., thereby forming a solid product, and
iii. the solid product is collected,
wherein the solid product comprises a part having a haze of less than 12% and a light transmittance of at least 88% when measured according to ASTM D1003A.

In a preferred embodiment, the temperature of the quenching liquid is below 20° C., more preferably below 10° C.

The invention also relates to the use of the transparent polymer film according to the invention described above, or obtainable by a process described below, as well as to particular embodiment of the extrudate product according to the invention described above.

The extrudate product according to the invention may well be a steam-sterilizable medical article, such as a container or a syringe, etc.

The transparent polymer film according to invention can be used for many applications, such as for barrier films and in electronic applications.

The barrier films can advantageously be applied in mono- and multilayered packaging materials.

The films may be used for electrical and electronic applications. Examples include the use of the films as PCB carrier etc., in electrodes, sensors, photovoltaic cells and other optical devices, display components, more particular as back plane for flat panel displays and flexible displays, such as LCD and OLEDs, including electronic paper and organic EL displays.

The transparent polymer film according to the invention is eminently suited for use as a substrate material for inorganic deposition, resulting in ultra-high barrier performance. The inorganic deposition may optionally be structured. Suitably, the inorganic deposit is an indium-tin-oxide (ITO) or a copper cladding. These make these films useful for ITO, a-Si TFT and Low temperature polysilicone TFT (LTPS).

The invention is further illustrated with the following Examples and Comparative Experiments.

| Materials | |
|---|---|
| PA-1 | Polyamide 46, aliphatic polyamide, Tm 295° C., Tg 80° C., VN = 230 ml/g |
| PA-2 | Polyamide 46/6, aliphatic copolyamide, 7 wt. % caprolactam, Tm 285° C., Tg 78° C., VN 215 ml/g |
| PA-3 | Polyamide 6T/4T/66, semi aromatic copolyamide, Tm 325 C., Tg 125° C., RV 1.9 |
| PA-4 | Polyamide 6T/66, semi aromatic copolyamide, Tm 320° C., Tg 100° C., RV 2.6 |
| PA-5 | Polyamide 6, aliphatic polyamide, Tm 220° C., Tg 51° C., RV = 3.2 |

Each of the polyamides comprised around 0.5-1.0 wt. % of a standard additive package comprising processing aids and heat stabilizers. Melting temperature (Tm), glass transition temperature (Tg), and relative viscosity (RV) mentioned herein were measured by the methods described below.

Methods

Viscoity: Relative Viscosity (RV), Viscosity Number (VN)

The measurement of the relative viscosity (RV) was performed according to ISO 307, fourth edition. For the measurement a pre-dried polymer sample was used, the drying of which was performed under high vacuum (i.e. less than 50 mbar) at 80° C. during 24 hrs. Determination of the relative viscosity was done at a concentration of 1 gram of polymer in 100 ml solvent at at 25.00±0.05° C. The viscosity number was measured at a concentration of 0.5 gram of polymer in 100 ml of solvent at 25.00±0.05° C. The solvent for the semi aromatic polyamides PA-1 to PA-4 was sulphuric acid 96.00±0.15% m/m, for PA-5 (polyamide 6) the solvent was 90 wt. % formic acid. The flow time of the solution (t) and the solvent (to) were measured using a DIN-Ubbelohde from Schott (ref. no. 53020) at 25° C.

The relative viscosity is defined as RV=t/t0.

The viscosity number was calculated as follows:

$$VN = \frac{\left(\frac{t}{t_0} - 1\right)}{c} = \left(\frac{t}{t_0} - 1\right) * 200$$

Wherein:
VN=viscosity number (mL/g)
t=average flow time of the sample solution, in seconds
$t_0$=average flow time of the solvent, in seconds
c=concentration, g/mL (=0.005)

DSC Measurements: Tg, Tm and Melting Enthalpy

The melting temperature (Tm) was measured according to ASTM D3418-03 by DSC in the second heating run with a heating rate of 10° C./min.

The melting enthalpy was measured according to ASTM D3418-03 by DSC in the second heating run with a heating rate of 10° C./min.

The glass transition temperature (Tg) was measured according to ASTM E 1356-91 by DSC in the second heating run with a heating rate of 10° C./min, falling in the glass transition range and showing the highest glass transition rate.

Optical Properties

The optical properties were measured according to ASTM D1003A, using a BYK Gardner XL 211 Hazeguard System comprising a halogen light source C. The sensing unit comprised an integrated sphere to collect light that is scattered by a specimen. The collected light was then measured with a silicon photo detector. The specimen was placed at the entrance port for measurement of haze and/or transmittance. The test specimens used had a cross section of 50 mm.

The light transmittance is the percentage of the luminous flux transmitted through a specimen compared to the luminous flux incident upon it.

Haze is the percentage of transmitted light passing through a specimen by forward scattering, which deviates from the incident light by no more than 2.5°.

Processing

Polyamide films were prepared by a film cast extrusion process. A single screw extruder (screw diameter 30 mm, L/D=30) was connected to a feed block with a slot die with adjustable die-lip. The length of the slot die was 300 mm and the die-width was 0.8 mm. The extruder was fed with the polyamide material. The film was taken up by and cooled on a chill role. The thickness of the film was regulated by the chill role winding speed, thereby affecting the drawdown ratio between the chill role winding speed and the extrusion speed. The extrusion speed was kept constant and was such that with a draw-down ratio of 14, the total thickness of the film was approximately 50 µm.

All films as described in the examples below were packed in alumina bags directly after production to prevent contact with moisture.

Comparative Experiment A

PA-1 was film processed with a temperature setting of the extrusion zones, feedblock and die of 300° C. The temperature of the chill role was 8° C. The distance between die and the position where the film touched the chill role was about 1 cm. Film processing was conducted without the presence of an air knife. Film thickness was 48 µm. The optical quality of the resulting film is quite poor with local white spots.

Example 1

Example 1 was identical to Comparative Experiment A except that an air knife was applied and the temperature of the chill role was 3° C. This temperature quench was achieved by cooling of the chill role with ice water. The resulting thickness of the film is 47 µm. The optic properties of the film, compared to CE-A had improved significantly; no white spots were present any more. The optical transparency as judged by the naked eye was good. The optical transparency measured according to the method described before was 92.5% (SD 0.1%) and the haze value was 2.3% (SD 0.4%).

Example 2

Example 2 was identical to example 1 with one difference: the film thickness was increased to 79 µm by reducing the chill role winding speed. The optical quality of the film judged by the naked eye was lower compared to the previous example. The measured optical transparency was 92.3% (SD 0.1%) and the haze value was 11.4% (SD 1.0%).

Comparative Experiment B

Comparative Experiment B was identical to example 1 with one difference: the film thickness was increased to 98 µm by reducing the chill role winding speed. The optical quality of the film judged by the naked eye was lower compared to the previous example, the film looked milky. The measured optical transparency was 86.3% (SD 0.1%) and the haze value was 16.8% (SD 1.0%).

Example 3

Example 3 was identical to example 1 with the exception that PA-2 was used as base material in stead of PA-1. Film thickness was 47 µm. The optical transparency as estimated by the naked eye was good. The optical transparency measured according to a method described before was 92.5% (SD 0.1%) and the haze value was 1.5% (SD 0.2%).

Example 4

In example 4 PA-3 material was film processed with a temperature setting of the extrusion zones of 340° C. and of the feedblock and die of 350° C. The distance between die and the position where the film touched the chill role was between 1 and 1.3 cm. The temperature of the chill role was 17° C. The film processing was conducted with the presence of an air knife. The resulting film had a thickness of 48 µm. The optical quality of the resulting film was good, with a transparency over 92% and a haze of less than 3%.

Comparative Experiment C

Comparative Experiment C was identical to example 4 with the exception of PA-4 material being applied instead of PA-3. The resulting film had a thickness of 45 µm. The film appeared to be somewhat hazy and far less transparent than the film described in the previous example, the optical transparency being less than 88% and the haze being over 12%.

Example 5

Example 5 was identical to example 4, except that a blend of PA-3 with PA-5, ratio 80/20, was used. The resulting film had a thickness of 48 µm and the optical quality was good.

Comparative Experiment D

Comparative Experiment D was identical to example 4 with the exception of PA-5 material being applied instead of PA-3, and the temperature setting of extrusion zones, feedblock and die were adjusted to 250° C. The resulting film had a thickness of 47 µm and the optical quality was good.

Further Measurements and Tests

All films as described in the above examples were packed in alumina bags direct after production to prevent contact with moisture.

DSC Study

Some of the above films, examples 1, 3 and 4, were studied by DSC, to learn about the crystallinity and crystallization behaviour of these films. Samples of the films were taken from alumina bags and directly afterwards measured by DSC.

The thermograms as obtained by the first heating curve are discussed. The film of example 4 exhibited a considerable cold crystallization peak after passing the glass transition temperature, which is considered to be indicative that the film material was highly amorphous after film production. The melting temperature was 320° C., with a corresponding melting enthalpy of 64 J/g. After cooling down the sample from the melt by 10° C./min to below room temperature and exposition of the sample to a second heating run with a heating rate of 10° C./min, no indications were found for a cold crystallization process. This indicates that the film as obtained from the film production process has an amorphous character, which could explain for its high transparency. However, upon annealing of the film, the film kept its transparent character, despite the crystallization induced by the annealing and evidenced by DSC.

The DSC thermograms of the film samples of examples 1 and 3 showed a different behavior, compared to example 4. No indications for cold crystallization between the glass transition temperature and the melting point were observed, indicating that the films had developed a stable crystalline morphology during film production. Together with the fact that the films are optical transparent, the interpretation could be that the crystallites present, if any, could be very small, smaller than the typical wavelength of light. The melting temperature of the PA46 film from example 1 was 282° C. with a melting enthalpy of 79 J/g. The melting temperature of the PA46 film from example 3 was 289° C. with a melting enthalpy of 85 J/g.

Annealing and Water Uptake

Water uptake of the film of example 1 was measured by thermogravimetric analysis. A microbalance was used in combination with an atmosphere with varying relative humidity. A film sample was brought in the microbalance and conditioned in a dry atmosphere to guarantee the film was dry at the start of the experiment. The sample was exposed to an atmosphere of 85% relative humidity at 85° C. the weight increase due to water uptake of the film was monitored. The water uptake of the film of example 1 was 6.8 wt %. A series of experiments was performed on film samples that had been thermally annealed in an oven under nitrogen stream at 260° C. before studying the water uptake. The annealing time was varied. An annealing time of 8 hrs resulted in a lowering of the water uptake from 6.8 wt % to 5.2 wt % at 85% relative humidity. Increasing the thermal annealing time to 24 hours resulted in a reduced water uptake of 4.6 wt %. Further increasing the annealing time to 84 hrs resulted in an even lower water uptake of 1.7 wt %. It was visually observed that the films retained their transparency, both after annealing and after the subsequent water absorption.

Stretching Experiments

Biaxial film stretching experiments were performed on PA46 films. These experiments were performed in a tentaframe device positioned in an oven. The films with areal dimensions of 10 cm*10 cm were clamped at the sides in this device. The stretching was performed on films taken from the alumina bags, clamped and consequently heated by hot air to the stretching temperature.

In a first stretching experiment, the film from Comparative Experiment A was stretched at a temperature of 100° C. The stretching process was not homogeneous distributed over the film. The film responded in a very heterogeneous manner. Rupture occurred at a stretching ratio of approximately 1.4*1.4.

In a second experiment, the film as prepared in example 2 was stretched at a temperature of 100° C. The stretching process was rather homogeneous and resulted in a transparent stretched film. Maximum stretching ratio before rupture occurred was approximately 2.0*2.0.

In a third experiment, the film from example 3 was allowed to swell in a water bath overnight. This film was stretched at room temperature and the maximum stretching ratio was 2.2*2.2. Film stretching occurred in a homogeneous manner. The film was heated to 120° C. and stretched in a second step to a total overall degree of stretching of 3.0*3.0. The resulting film appeared homogeneous and was transparent.

Oxygen Permeability Test

Films of examples 4 and 5 and Comparative Experiment D were subjected to an oxygen permeability test and the observed permeability for examples 4 and 5 was normalized against that of Comparative Experiment D. Compared to the normalized value of 1 for Comparative Experiment D, the films of examples 4 and 5 had a much lower oxygen permeability, which differed only slightly from each other: 0.25 against 0.26. Apparently the semi-crystalline polyamide PA-3 in example 4 showed a much lower oxygen permeability than the aliphatic polyamide PA-6 in Comparative Experiment D. Despite the presence of 20 wt. % PA-5 in the blend of example 5, the low oxygen permeability of PA-3 was hardly affected, at least in much lower extend than could be anticipated on a weight basis.

The invention claimed is:

1. An optically transparent extrudate product made of a polymer composition comprising at least 60 wt. %, relative to total weight of the polymer composition, of a semi-crystalline polyamide (A) having a melting temperature TmA of at least 270° C., wherein the semi-crystalline polyamide (A) is a semi-crystalline semi-aromatic polyamide or a blend thereof with a semi-crystalline aliphatic polyamide, and wherein the polymer composition has a melting temperature TmC of at least 270° C., and the extrudate product has a haze of less than 12% and a light transmittance of at least 88%, measured with the method according to ASTM D1003A.

2. The product according to claim 1, wherein the product is a polymer film.

3. The product according to claim 1, wherein the polymer composition has a melting enthalpy, of at least 25 J/g, measured according to ASTM D3418-03 by DSC with a heating rate of 10° C./min.

4. The product according to claim 1, wherein the semi-crystalline polyamide (A) is a semi-crystalline semi-aromatic copolyamide comprising repeat units derived from:
    (a) 25-45 mole % terephthalic acid,
    (b) 5-25 mole % of an aromatic dicarboxylic acid different from terephthalic acid, and/or an aliphatic dicarboxylic acid,
    (c) 5-30 mole % of an diamine chosen from the group consisting of ethylene diamine, trimethylene diamine, tetramethylene diamine and pentamethylene diamine,
    (d) 20-45% of a diamine comprising at least 6 C-atoms, and optionally
    (e) 0-10 mole % of one or more aminocarboxylic acids and or lactams
    (f) 0-3 mole % of compounds being mono-functional or tri-functional in amino and/or carboxylic acid groups; wherein the mole % of each of a-f is relative to the total of a-f.

5. The product according to claim 1, wherein the polymer composition comprises at least one polymer other than the semi-crystalline polyamide (A) and/or at least one additive.

6. The product according to claim 1, wherein the polymer composition comprises an amorphous semi-aromatic polyamide and/or a semi-crystalline aliphatic or semi-aromatic polyamide having a melting temperature below 270° C.

7. The product according to claim 1, wherein the polymer composition consists of
    (A) 60-100 wt. % of the semi-crystalline polyamide (A),
    (B) 0-40 wt. % of at least one polymer other than the semi-crystalline polyamide (A), and
    (C) 0-10 wt. % of the at least one additive selected from the group consisting of plasticizers, stabilizers, dyes, optical brighteners, coloring agents, lubricants, nanoscale filler and strengthening materials, wherein
    the wt. % is relative to the total weight of the polymer composition.

8. The product according to claim 1, wherein the product has a thickness of at most 500 μm.

9. The product according to claim 1, wherein the product has a haze of less than 5% and a light transmittance of at least 90% when measured according to ASTM D1003A.

* * * * *